United States Patent [19]
Pinder

[11] Patent Number: 6,112,074
[45] Date of Patent: Aug. 29, 2000

[54] RADIO COMMUNICATION SYSTEM WITH AUTOMATIC GEOGRAPHIC EVENT NOTIFICATION

[75] Inventor: Ellis Arthur Pinder, Davie, Fla.

[73] Assignee: Motorola, Inc., Schaumburg, Ill.

[21] Appl. No.: 08/995,922

[22] Filed: Dec. 22, 1997

[51] Int. Cl.[7] .................................................. H04M 11/00
[52] U.S. Cl. ....................... 455/404; 455/456; 340/601
[58] Field of Search ..................................... 455/404, 422, 455/424, 446, 456, 457, 458, 524, 525, 561, 562; 379/43, 49, 48; 340/949, 968, 601, 602, 825.44, 540

[56] References Cited

U.S. PATENT DOCUMENTS

| | | | |
|---|---|---|---|
| 4,097,809 | 6/1978 | Miller | 325/54 |
| 4,887,291 | 12/1989 | Stillwell | 379/39 |
| 5,052,048 | 9/1991 | Heinrich | 455/66 |
| 5,131,020 | 7/1992 | Liebesny et al. | 455/422 |
| 5,218,367 | 6/1993 | Sheffer et al. | 455/456 |
| 5,371,900 | 12/1994 | Bar-On et al. | 455/508 |
| 5,390,237 | 2/1995 | Hoffman, Jr. et al. | 379/67 |
| 5,444,433 | 8/1995 | Gropper | 340/601 |
| 5,493,285 | 2/1996 | Yoshizawa | 340/825.44 |
| 5,541,980 | 7/1996 | Urewicz | 455/404 |
| 5,574,999 | 11/1996 | Gropper | 455/186.1 |
| 5,628,050 | 5/1997 | McGraw et al. | 455/12.1 |
| 5,740,538 | 4/1998 | Joyce et al. | 455/456 |
| 5,852,775 | 12/1998 | Hidary | 455/404 |
| 5,910,763 | 6/1999 | Flanagan | 340/286.02 |
| 5,917,887 | 6/1999 | Fesler et al. | 379/48 |

OTHER PUBLICATIONS

Weather Page, Alphanumeric Paging Service, Forecast Zones Website Design ©1996 Vellum Design.

*Primary Examiner*—William G. Trost
*Assistant Examiner*—Charles Craver
*Attorney, Agent, or Firm*—Andrew S. Fuller

[57] ABSTRACT

A subscriber (125) to a radio communication system (110) is automatically notified of an event affecting or potential affecting a particular geographical locality. The radio communication system obtains such event and locality information (310, 320), and uses the locality information to transmit the event information to subscribers of that system potentially affected by the event. In one embodiment, the system automatically uses only transmitters that service at least a portion of the affected locality to transmit the event information (330, 340). In another embodiment, the system automatically transmits event information selectively to those subscribers having a location designation corresponding to the particular locality (410, 420).

3 Claims, 4 Drawing Sheets

6,112,074

RADIO COMMUNICATION SYSTEM WITH AUTOMATIC GEOGRAPHIC EVENT NOTIFICATION

TECHNICAL FIELD

This invention relates in general to radio communication systems, and more particularly, to event information distribution in radio communication systems.

BACKGROUND OF THE INVENTION

The use of portable radio communication devices, such as pagers, radio telephones, and the like, is increasingly becoming common place for a significant portion of the population. Many such devices currently provide access to a variety of information sources through one or more subscription services. For instance, it is known to provide information such as current news, sports, and weather, on a regularly updated basis through paging devices. As communication devices become more integrated, there is a greater increase in demand for additional functionality that is attendant to the needs of the user. One such need is that of quick access to local weather information, particularly in emergency situations.

Weather information is often sourced from a national weather service, particularly when emergency conditions exist. For example, the National Oceanic and Atmospheric Administration (NOAA) of the United States of America operates a national weather service (NWS), which broadcasts information, derived from data collected at various observing stations, for public dissemination. The NWS provides detailed location specific information which may be invaluable for certain users. Such information is currently disseminated through radio broadcasts and other bulk distribution methods.

One prior art method of weather information dissemination is described in U.S. Pat. No. 5,390,237, issued to Hoffman, Jr. et al., on Feb. 14, 1995, for a Weather Information Interface System. Here, a remote access system provides a menu driven telephone interface that enables users to select a particular remote weather station, to obtain information reported or broadcasted by that weather station. The system requires user initiation and user interaction to obtain weather information. Thus, important information may not be disseminated in a timely manner.

It is desirable to have a system that can provide quick access to weather and other event information to a large number of people concerned with an affected locality. Such a system should provide for a minimum of user interaction, and should preferably not require user initiation thereby ensuring timely dissemination of the information. Accordingly, a new automatic event notification system is needed.

DETAILED DESCRIPTION OF THE PREFERRED EMBODIMENT

Figure 1:
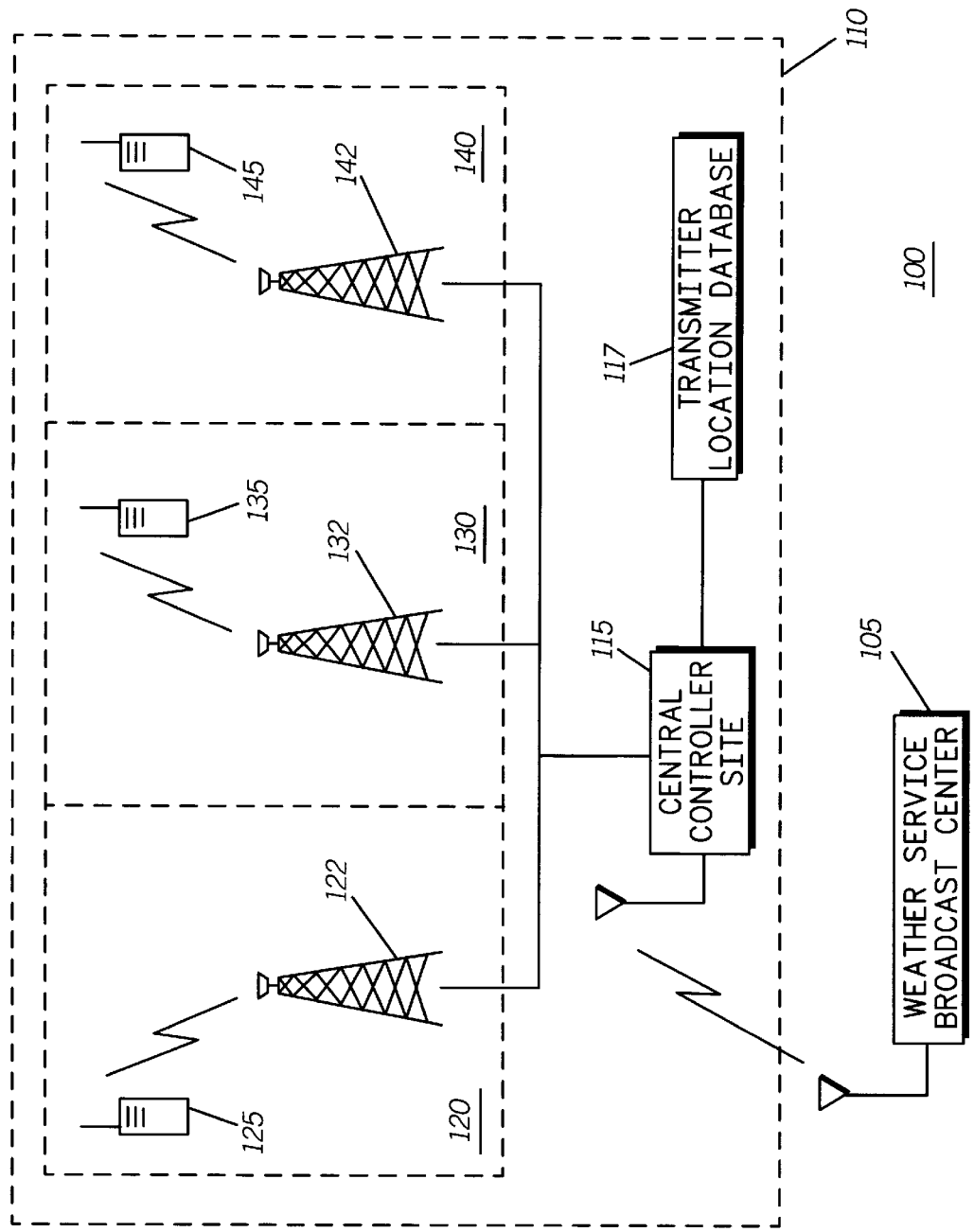
FIG. 1 is a block diagram of a communication environment including a radio communication system, in accordance with the present invention.

While the specification concludes with claims defining the features of the invention that are regarded as novel, it is believed that the invention will be better understood from a consideration of the following description in conjunction with the drawing figures, in which like reference numerals are carried forward.

The present invention provides a method for automatic subscriber notification of an event affecting or potential affecting a particular geographical locality. When such event and locality information is received, a radio communication system uses the locality information to transmit the event information to subscribers of that system potentially affected by the event. In one embodiment, the system automatically uses only transmitters that service at least a portion of the affected locality to transmit the event information. In another embodiment, the system automatically transmits event information selectively to those subscribers having a location designation corresponding to the particular locality. The present invention is well suited for public dissemination of information concerning weather and emergency conditions.

FIG. 1 is a block diagram showing a communication environment 100, in accordance with the present invention. The communication environment 100 includes a two-way radio communication system 110 that receives information from a weather service broadcast center 105. In the preferred embodiment, the weather service broadcast center 105 is a NOAA weather radio system operated by a national weather service in the United States of America. A NOAA station broadcasts weather and emergency event information in a digital message using a specific area message encoding protocol. The message transmitted from the NOAA station contains event codes, location codes, action time, and duration information for severe weather bulletins, as well as local and national emergencies. In the preferred embodiment, the radio communication system 110 receives event and locality information from the weather service broadcast center 105 via wireless communication signals. However, wired communication links to such facilities may be provided in accordance with the present invention.

The radio communication system 110 includes a site having a central controller 115, geographically dispersed sites having transmitters 122, 132, 142, and subscriber units 125, 135, 145. The central controller 115 interfaces with the transmitters 122, 132, 142 to provide an infrastructure for supporting the subscriber units 125, 135, 145. Each transmitter 122, 132, 142 serves a particular geographical coverage region 120, 130, 140. The radio communication system 110 may be, for example, a cellular communication system, in which the geographical coverage regions 120, 130, 140 are referred to as cells, and the transmitter sites referred to as base stations or cell sites. Generally, the coverage area 120, 130, 140 served by each transmitter is small relative to the overall coverage area of the system 110. Subscriber units 125, 135, 145 operating within a particular coverage area is generally serviced by the transmitter site serving that coverage area. In a cellular system, the subscriber unit registers with a particular cell site and is considered to be affiliated with that site. Thus the site affiliation for a particular subscriber unit provides an estimate of the general geographic location of the particular subscriber unit. In accordance with the present invention, the central controller site 115 has an associated database 117 that maps event location codes, such as weather location codes, with transmitter or cell site location information, or coverage area information.

Figure 2:
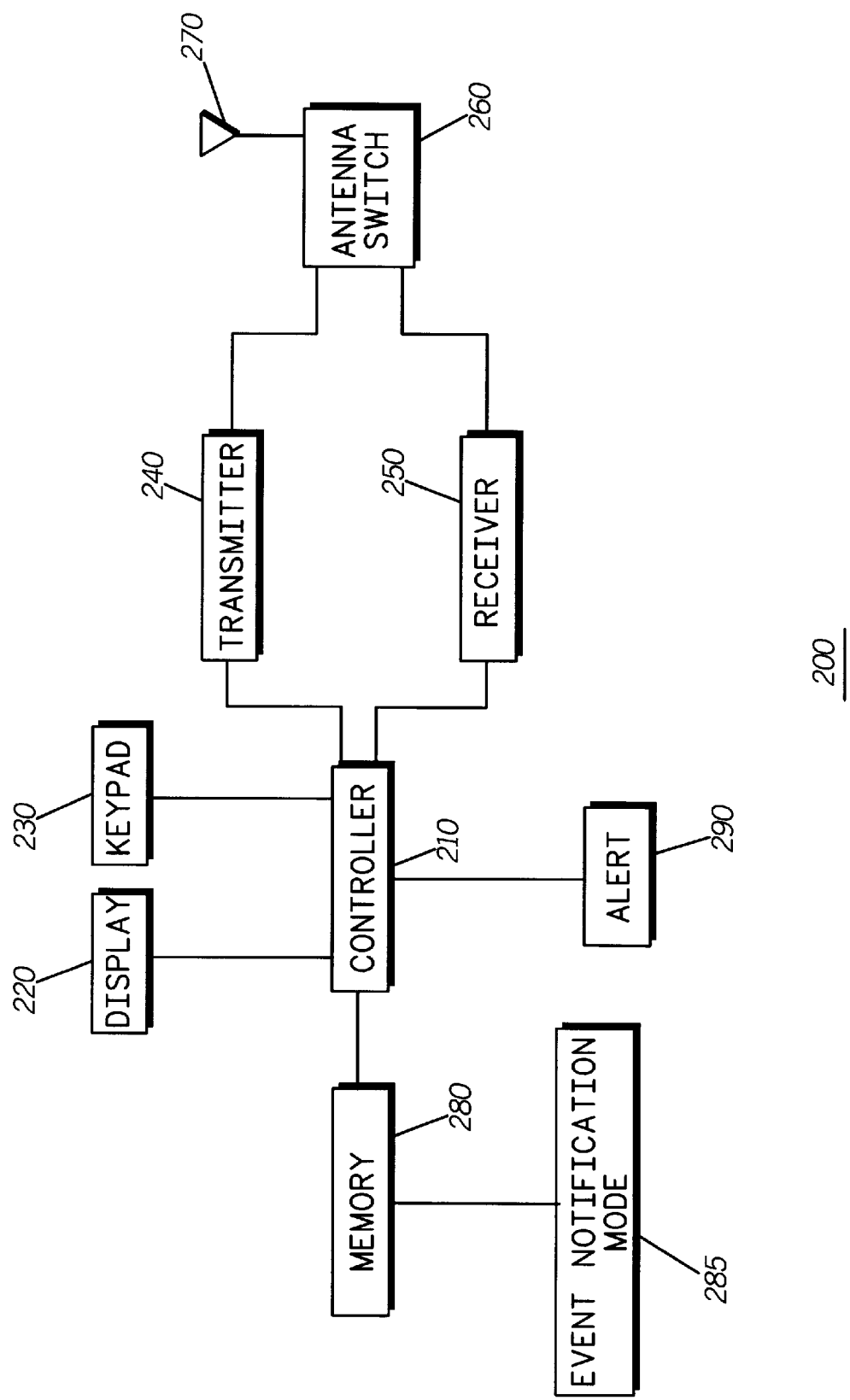
FIG. 2 is a block diagram of a communication device that operates as a subscriber unit in the radio communication system of FIG. 1, in accordance with the present invention.

FIG. 2 is a block diagram of a communication device 200, such as used as a subscriber unit in the radio communication system 100, in accordance with the present invention. The communication device 200 is preferably a radio device capable of processing wireless communication signals, such as a two-way radio, radio telephone, pager device, and the like. In the preferred embodiment, the communication device 200 is a two-way radio telephone having a user interface for presenting information to a user. The radio telephone 200 includes a controller 210 that is coupled to a memory 280, to a transmitter 240, and to a receiver 250, to provide communications circuitry. The transmitter 240 and the receiver 250 are coupled via an antenna switch 260 to an antenna 270. For transmit operations, the controller 210 configures the antenna switch 260 to couple the transmitter 240 to the antenna 270. Similarly, for receive operations, the controller 210 operates the receiver 250 to process signals obtained via the antenna 270. Receive and transmit operations are conducted under instructions stored in the memory 280. A user interface comprising a display 220, a keypad 230, and an alert module 290, is coupled to the controller 210 to provide access to radio functions and information. In accordance with the present invention, the radio telephone 200 also includes an event notification mode 285 that is used to determine the response provided by the radio telephone when notification of an event is received. Preferably, the event notification mode allows a user to customize whether an incoming emergency or weather alert event overrides current radio telephone functions to make such information available to the user immediately.

Figure 3:
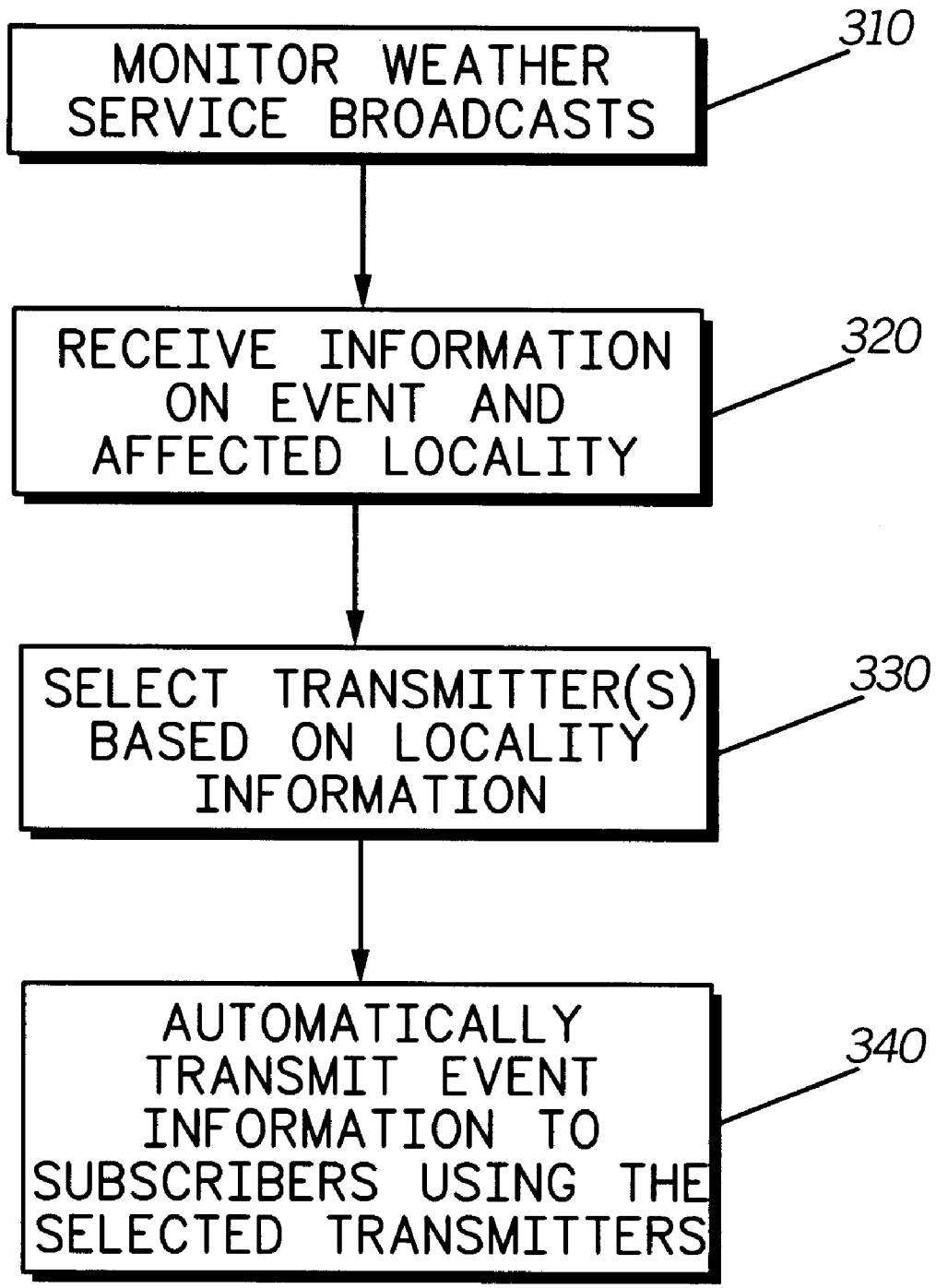
FIG. 3 is a flowchart of procedures used by the radio communications system of FIG. 1 to automatically transmit event information to a particular subscriber, in accordance with the present invention.

FIG. 3 is a flowchart of procedures used at the radio communication system 110 for automatic transmission of event information to potentially affected subscribers, in accordance with the present invention. In the preferred embodiment, the radio communication system monitors a weather service broadcast to receive information on an event and affected locality, i.e., the particular geographic region affected or potentially affected by the event, steps 310, 320. While the preferred embodiment uses a weather service to provide event information, event information in general may be received from a variety of sources, including networked servers, dial-up servers, and the like. Upon receiving such information, the system automatically transmits the event information to selected subscribers. In one embodiment, the system automatically transmits, in response to the received information, event information to subscribers, using only transmitters that service at least a portion of the affected locality. Thus, the system selects transmitters based on the locality information received, step 330, and automatically transmits event information to subscriber units using the selected transmitters, step 340. In the preferred embodiment, the data received from the weather service center contains weather location codes which are mapped to transmitter locations via the transmitter location database 117. Upon receiving a particular weather location code from the weather data source as part of the locality information, the system queries the database for transmitter location using this code as a search criteria. For example, in a cellular system application, there is a determination made that a cell site serves at least a portion of the particular geographic location affected, and the system transmits event information to those subscriber units that are affiliated with the cell site.

Figure 4:
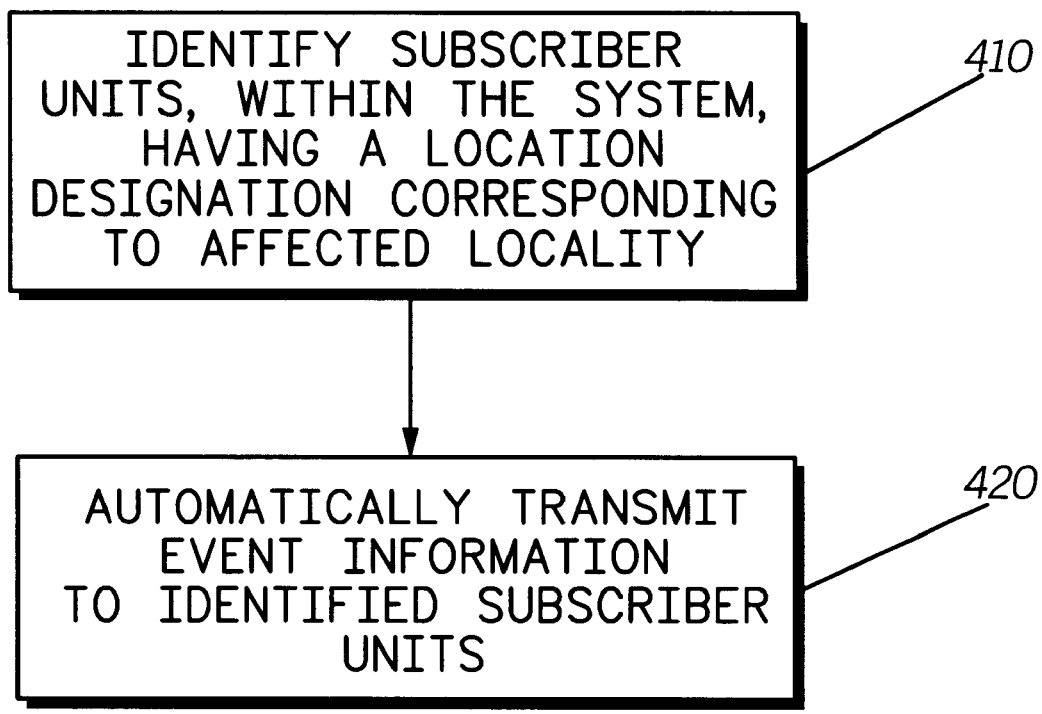
FIG. 4 is a flowchart of alternative procedures used at the radio communication system to transmit event information, in accordance with the present invention.

FIG. 4 is a flowchart of alternative procedures used at the radio communication system 110 to automatically notify subscriber units of geographically based event information. In this embodiment, upon identifying the location affected by the event, the system identifies subscriber units having a location designation corresponding to the affected locality, step 410. The subscriber location designation may be in the form of a prior registration by the subscriber of a particular area of interest, such that the subscriber should be notified of events affecting that particular area of interest. In another instance, the subscriber location designation corresponds to the site at which the subscriber is registered to communicate within the system, or its site affiliation. The system then automatically transmits the event information to the identified subscriber units, step 420.

Thus, a system operates to receive event information, such as weather occurrences and/or emergency conditions, and information on the affected locality. The system automatically broadcasts information concerning the event selectively to subscribers potentially having an interest in the particular event. The event information may be transmitted to a particular subscriber unit upon a determination of a prior registration by that subscriber unit indicating an interest in event information corresponding to the particular geographic location. Alternatively, the event information may be automatically broadcasted using only transmitters that service at least a portion of the affected locality. Additionally, the event information may be transmitted to those subscriber units affiliated with a communication site within the affected locality.

The present invention provides significant advantages over the prior art. Weather and other emergency events may be publicly disseminated quickly and automatically without user interaction. For example, if a user is present in a particular locality that is affected by an event, that user may be automatically notified of such an event. Moreover, a subscriber may be interested in events occurring at a particular locality, and that subscriber may be automatically notified of such events. Such selective event notification provides a much more efficient way of publicly dissemination of weather and emergency conditions.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A method for automatic event notification in a radio communication system having a plurality of geographically dispersed transmitters, comprising the steps of:

receiving weather information and corresponding locality information broadcasted from weather a data source;

receiving a weather location code from the weather data source as part of the locality information; and querying a database, which database maps weather location codes to corresponding transmitter locations, for a transmitter location using the weather location code as a search criteria;

determining location information for a subscriber unit operating within the radio communication system; and automatically transmitting the event information to the subscriber unit when the location information corresponds to the locality information.

2. A method for automatic event notification in a radio communication system having a plurality of geographically dispersed transmitters, comprising the steps of:

receiving weather information and corresponding locality information broadcasted from a weather data source;

receiving a weather location code from the weather data source as part of the locality information; and querying a database, which database maps event location codes to corresponding transmitter locations, for a transmitter location using the weather location code as a search criteria; and automatically transmitting the weather information to the subscriber unit using the transmitter location.

3. A method for automatic event notification in a radio communication system having a plurality of geographically dispersed transmitters, comprising the steps of:

receiving event information and corresponding locality information broadcasted from an event data source;

receiving an event location code from the event data source as part of the locality information; and querying a database, which database maps event location codes to corresponding transmitter locations, for a transmitter location using the event location code as a search criteria; and automatically transmitting the event information to the subscriber unit using the transmitter location.

\* \* \* \* \*